June 2, 1970     C. S. BEUYUKIAN ET AL     3,514,842
BRAZING PROCESS
Filed Jan. 16, 1968
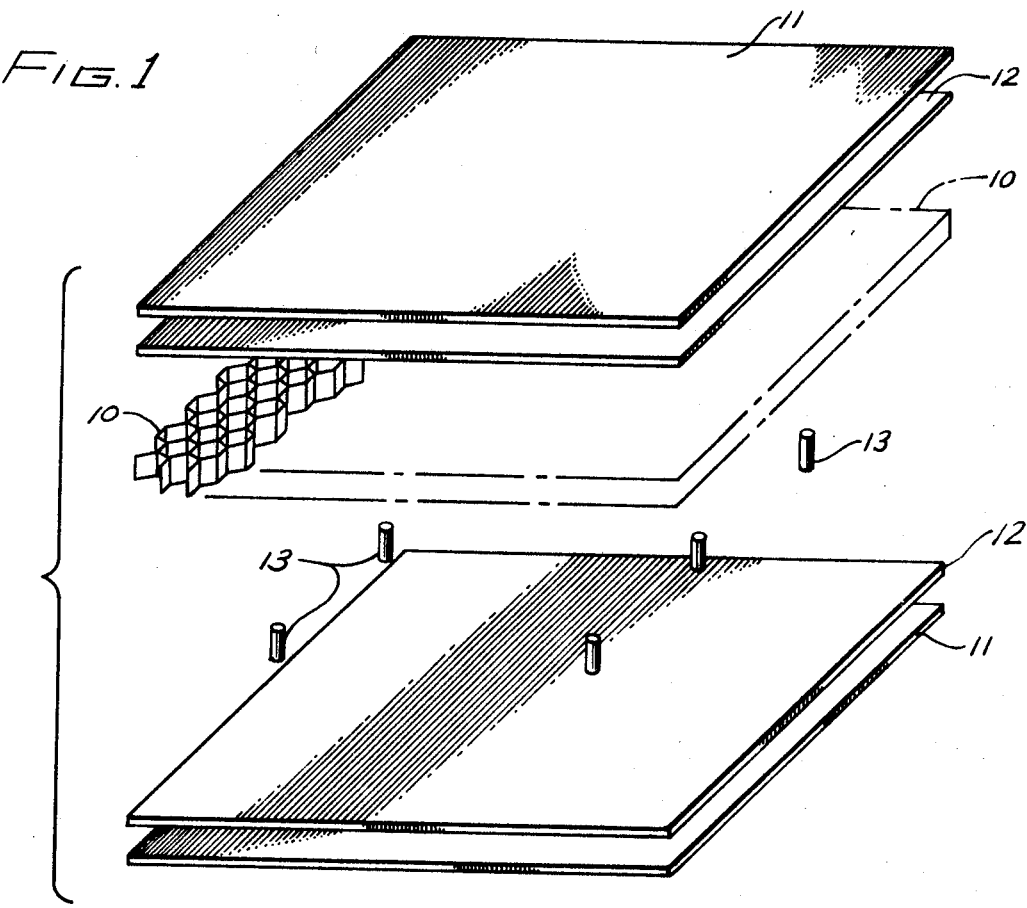
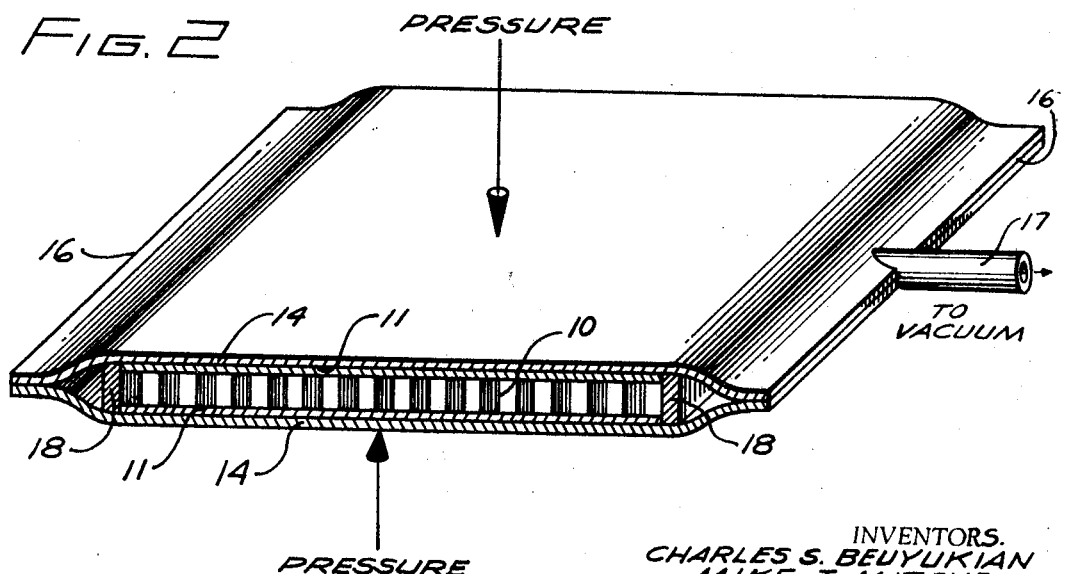
INVENTORS.
CHARLES S. BEUYUKIAN
MIKE J. MITCHELL
BY
Richard D. Seibel
ATTORNEY United States Patent Office 3,514,842
Patented June 2, 1970

3,514,842
BRAZING PROCESS
Charles S. Beuyukian, Gardena, and Mike J. Mitchell, Downey, Calif., assignors to North American Rockwell Corporation
Filed Jan. 16, 1968, Ser. No. 698,228
Int. Cl. B23k 31/02
U.S. Cl. 29—4.94
11 Claims

ABSTRACT OF THE DISCLOSURE

A process is described for forming a brazed honeycomb sandwich commencing with conventional adhesive bonded honeycomb core. In a typical embodiment conventional phenolic bonded, perforated aluminum honeycomb core is sandwiched between two aluminum face sheets with brazing alloy between the face sheets and the core. This assembly is enclosed in a sheet steel envelope which is sealed and continuously evacuated. The enclosed assembly is heated to a temperature in excess of 850° F. to decompose the phenolic resin into a carbonaceous char and gaseous decomposition products. During heating the dynamic vacuum extracts the gaseous products from the honeycomb core to prevent braze contamination. After complete outgassing, the assembly is heated to a temperature sufficient to melt the brazing alloy to effect brazing of the honeycomb sandwich.

BACKGROUND

In many situations it is desirable to have a brazed honeycomb sandwich since this type of assembly has greatly superior properties as compared with adhesively bonded honeycomb sandwich. In addition to improved mechanical properties for the honeycomb sandwich, a very large increase in thermal conductivity through the panel is achieved with brazing.

Despite the obvious advantages of a brazed aluminum honeycomb sandwich this method of fabrication has not been previously used largely because of the expense of brazed or spot welded honeycomb core for making up the sandwich. In addition, brazing has previously required use of flux in the joints and such fluxes enclosed in a sandwich material provide a site for corrosion. Because the flux is necessarily inside the assembly, it cannot be removed after brazing. Fluxless brazing is preferred, or at least brazing with a non-corrosive flux. Adhesively bonded honeycomb core has not been suitable even for fluxless brazing because of contamination of surfaces by the adhesive which interferes with good wetting and prevents strong brazed assemblies.

BRIEF SUMMARY OF THE INVENTION

Therefore, in practice of this invention, according to a preferred embodiment there is provided a brazing process wherein an at least partly adhesively bonded structure is enclosed in an evacuable vessel and the structure is heated in a dynamic vacuum to a temperature above the decomposition temperature of the adhesive and below the brazing temperature for a time sufficient to remove the gaseous products of decomposition of the adhesive. After the adhesive has been decomposed and outgassed by the vacuum the structure is subsequently heated to the brazing temperature to effect good bonding.

Many of the attendant advantages of this invention will be readily appreciated as the same becomes better understood by reference to the following detailed description when considered in connection with the accompanying drawings wherein:

FIG. 1 illustrates in exploded view a typical honeycomb sandwich employed in practice of this invention, and FIG. 2 illustrates a honeycomb sandwich enclosed in an evacuable envelope for bonding according to the principles of this invention.

Throughout the drawings like figures refer to like parts.

In the practice of this invention a sub-assemblage of parts is temporarily held in place by an adhesive during early stages of fabrication and after being fixed in position in an overall assembly, the adhesive is removed to permit brazing. The sub-assembly of adhesively bonded parts can be any of a number of collections such as clusters of tubes for heat exchangers, however a preferred embodiment comprises assembly of honeycomb sandwich material. Aluminum honeycomb core is often made of foil gauge thicknesses of aluminum ribbon, typically 0.001 to 0.004 inch thick and such gauges are very difficult to weld. Instead the honeycomb is made by placing stripes of adhesive across flat foil gauge strips of aluminum. The strips are pressed together side by side with the stripes of adhesive staggered in successive layers. The adhesive is then cured to firmly bond the strips into a body known as a hobe.

When it is desired to make a sandwich with face sheets and honeycomb core, the hobe is stretched to give an open core structure having the desired density. Upon stretching the hobe the strips of foil gauge aluminum are bent into corrugations with the heights and depths of the corrugations being adhesively bonded to successive strips and intermediate angulated portions being unbonded. The cells thus formed are hexagonal in section with opposite sides of the hexagon adhesively bonded to adjacent strips; the bonded areas being known as the nodes of the core. It will be apparent that square, sinusoidal, or other cross sections of core can be employed. The honeycomb core is thus a sub-assembly of parts held together by adhesive for use in a final assembly with face sheets sandwiching the core. Previously the face sheets have been adhesively bonded to the core to form a sandwich.

FIG. 1 illustrates in exploded view a typical honeycomb panel as employed in practice of this invention according to a preferred embodiment. As illustrated therein there is provided a conventional perforated honeycomb core 10, wherein strips of metal forming the honeycomb cells are adhesively bonded together by a conventional adhesive resin. Tiny perforations (not shown) are provided through the strips used to form the honeycomb core so that the cells of the honeycomb are not gas tight. If desired instead of perforated core, light scribe marks on the face of the hobe before stretching provides vents for gas in an assembled sandwich. Likewise gas permeable face sheets can be employed. Such honeycomb materials are commercially available in a wide variety of alloys, adhesives, cell sizes, and thicknesses. On either side of the honeycomb core 10 there is provided a face sheet 11. A layer of brazing material 12 is provided between the honeycomb core 10 and the face sheets 11. The brazing material can be provided as a plated or roll bonded layer on the face sheets 11 or can be provided as a separate foil sheet in the sandwich. It is preferred to employ a roll bonded brazing alloy layer 12 since these are generally thinner, add less weight to the honeycomb sandwich, and are easier to handle than multiple sheets.

In order to prevent crushing of the honeycomb core during processing as hereinafter described, a plurality of support posts 13 are provided in the sandwich. These posts may take the form of metal pins or tubes having a length substantially the same as the thickness of the honeycomb core. These support posts are arranged intermittently in the cells of the honeycomb core for providing greater rigidity and support for the face sheets at elevated brazing temperatures to prevent crushing of the thin honeycomb core material under processing pressures.

In practicing the process of this invention according to a preferred embodiment the adhesively bonded honeycomb core 10 and the face sheets 11 are assembled in a loose stack with the support posts 13 in occasional cells of the honeycomb core. A thin layer of brazing alloy 12 is provided between the face sheets and the honeycomb core. This loose stack of material, ultimately to form a brazed honeycomb structure, is enclosed in an envelope formed of two thin relatively flexible metal sheets 14 (FIG. 2) which are then welded together around the periphery 16 to provide a closed envelope containing the honeycomb structure to be brazed. A vacuum tube 17 is welded to the envelope for evacuation thereof. It is also preferred to place a rigid metal frame 18 around the loose stack of honeycomb core to prevent crushing thereof during subsequent processing.

After the envelope or retort is sealed and leak checked it is connected to a vacuum pump (not shown) by way of the tube 17 and continuously pumped to provide a dynamic vacuum during processing. Since the honeycomb core 10 is provided with tiny perforations or other vents through the ribbons of aluminum forming the cell walls, any gas within the honeycomb cells is evacuated in due course. The pressure differential between atmospheric pressure and the vacuum inside the envelope presses the thin walls of the envelope against the face sheets and firmly holds the honeycomb core in place. After evacuating and while a dynamic vacuum is being drawn on the envelope or retort, it is slowly heated in a heated platen press, furnace, or other suitable heating equipment. The assemblage is slowly heated, while still under vacuum, to a temperature in excess of the decomposition temperature of the adhesive in the honeycomb core, and below the brazing temperature for a sufficient time to evacuate all of the gaseous decomposition products of the adhesive.

In order to braze aluminum without the use of liquid or solid fluxes it is necessary that the surfaces to be brazed be clean. Therefore, the adhesive in the honeycomb core must not be allowed to condense on any of the joint areas in the structure. For this reason, slow heating with continuous dynamic vacuum is desirable to effect complete evacuation of all decomposition products as they are formed. It should be noted that the conventional adhesive resins employed in honeycomb core do not decompose to yield only gaseous products, but a solid carbonaceous residue or char usually remains in the originally adhesively bonded joints at the nodes of the core, however, so long as it remains in this position it does not interfere with subsequent brazing of the assembly of face sheets and honeycomb core as hereinafter described. In addition to removing decomposition products the vacuum gives a pressure differential across the wall of the retort for holding the strips of honeycomb core in position relative to the face sheets after the adhesive has been decomposed and before brazing.

After the assemblage is cleared of gaseous decomposition products of the adhesive it is heated to the brazing temperature either under vacuum or after partial back-filling with an inert gas. If desired for some alloys a reducing gas may be employed at a pressure less than atmospheric for maintaining a pressure differential. Since the surfaces of the face sheets and the edges of the honeycomb core are clean and free of decomposed adhesive, good wetting by the molten brazing alloy is obtained without the use of fluxing materials which could introduce sources of corrosion during subsequent use of the sandwich structure. After brazing, the sandwich structure is allowed to cool and is removed from the sheet metal retort for use. The metal frame to prevent crushing is removed, but the support posts in cells of the core are left in place.

By completely removing the gaseous decomposition products of the adhesive prior to brazing, reliable bonds are obtained between the face sheets and the honeycomb core and to some extent in the core, without the use of flux. It is found in practice of this invention that generous fillets are provided between the face sheets and the cell walls and tensile tests of honeycomb panels constructed according to the principles of this invention show failure of the panels in the honeycomb core material rather than at the interfaces, indicating that high strength bonds are obtained. Generally it is found that little brazing occurs in the joints previously adhesively bonded because of the char present, however a thin column of braze alloy commonly forms between the face sheets at the intersection of two strips; that is, the Y-shaped joint at the edge of a cell node has braze alloy bonding the two strips together in lines running along the edge of the decomposed adhesive stripe. The two lines or columns of braze alloy at each node bond the core strips together in joints at least as strong as the adhesively bonded honeycomb core and excellent tensile strengths are recorded for panels made in this manner.

In a specific example of practice of this invention, brazed aluminum honeycomb sandwich structures are made from adhesively bonded core. Both flat panels and curved or tapered panels are readily prepared merely by performing the core or face sheets in a conventional manner and employing suitably shaped dies and retorts. Conventional aluminum honeycomb core adhesively bonded with a conventional phenol formaldehyde resin is employed along with aluminum alloy face sheets. Commercially available cores are employed having pin-hole perforations in the cell walls for removal of gases. A layer of brazing alloy is formed on at least one side of each of the face sheets and it is preferred to employ an alloy of aluminum with 7½ to 12% silicon since this material readily wets aluminum without the use of flux. Although the melting point of the aluminum-silicon brazing alloy is fairly high, it is sufficiently below the melting temperature of most conventional aluminum alloys that satisfactory brazing is accomplished.

A loose stack of face sheets on opposite sides of a honeycomb core with brazing alloy therebetween is enclosed in a steel frame 18 and sealed into a welded envelope 16 of thin stainless steel sheets. A vacuum is drawn on the assembly and it is inserted into a heated platen press. The temperature is slowly raised to a temperature of about 850° F. Decomposition of the phenolic resin adhesive begins to yield substantial volumes of gaseous products at about 400 to 500° F. and thermal decomposition continues to a temperature in the range of from 750 to 850° F. If desired the temperature can be held at this value to assure complete decomposition of the adhesive. This is often desirable to minimize the effects of thermal lag in the structure. After gaseous decomposition products are removed by the vacuum, it is preferred to back-fill the envelope with a lower than atmospheric pressure of argon or other inert gas so that a pressure differential exists across the envelope for holding the core in place, however, the pressure is low enough to prevent crushing the core. This helps assure parallel face sheets after heating to the brazing temperature which is high enough that the aluminum is quite soft and readily deformed.

Whether partially back-filled or kept in vacuum, the structure is then heated to the brazing temperature, which for the 7½ to 12% silicon in aluminum brazing alloys is above at least 960° F. and preferably is about 1050° F. After brazing the part is cooled, the stainless steel retort 16 cut away, and frame 18 removed. If desired, the aluminum honeycomb sandwich can be appropriately aged to develop maximum physical properties in a conventional manner.

It will be apparent that in lieu of the described aluminum honeycomb core, many other configurations and materials can be employed in practice of this invention. Thus, for example, square cells of core or sinusoidal strips can be used or a core made up of pins may find application for heat exchangers. Similarly, honeycomb core and face sheets are readily available in many grades of stainless steel and nickel base alloys as well as aluminum. Similarly other adhesive resins thermally decomposable below the brazing temperature may be employed such as nylon modified phenolic resins, epoxy resins, polyesters and the like. The adhesives employed may be completely evaporable rather than decomposing to leave a char. It is clear that structures other than honeycomb can be bonded in practice of this invention. Other assemblies may employ thermally decomposable adhesives to temporarily hold parts in place during assembly and handling with the adhesive decomposed and evacuated prior to brazing the assembly.

Other variations are readily apparent such as enclosing the parts to be brazed in a vacuum chamber that also includes a furnace or even a press. Likewise an evacuated envelope can be heated in an autoclave to increase the differential pressure on the assembly.

Obviously, many other modifications and variations of the present invention are possible in light of the above teachings. It is therefore to be understood that within the scope of the appended claims the invention may be practiced otherwise than as specifically described.

What is claimed is:

1. A process for brazing comprising:
   enclosing an at least partly adhesively bonded structure to be brazed in an evacuable vessel;
   heating the structure in dynamic vacuum to a temperature above the decomposition temperature of the adhesive and below the brazing temperature for a time sufficient to remove the gaseous products of adhesive decomposition; and
   subsequently heating the structure to brazing temperature.

2. A process as defined in claim 1 further comprising the step of applying pressure to the structure during the steps of heating for holding the structure together after decomposition of the adhesive.

3. A process for brazing as defined in claim 1 wherein the enclosing step comprises:
   sealing the structure in an evacuable envelope having an internal surface conforming closely to an external surface of the structure; and further comprising the step of
   applying differential pressure on the envelope during the steps of heating for holding the structure in position after decomposition of the adhesive.

4. A process for brazing as defined in claim 1 wherein the structure comprises
   an adhesively bonded sandwich core; and
   a face sheet on at least one side of said sandwich core for brazing thereto to form a unitary sandwich structure.

5. A process as defined in claim 1 wherein said structure comprises:
   an aluminum honeycomb core bonded with an adhesive resin;
   a pair of aluminum face sheets, each on an opposite side of said honeycomb core for brazing thereto to form a honeycomb sandwich structure; and
   a layer of brazing material between each of said face sheets and said honeycomb core.

6. A process as defined in claim 5 wherein said first heating step is up to about 850° F. for decomposing and evacuating gaseous products of said adhesive resin.

7. A process as defined in claim 6 wherein:
   said brazing material comprises a layer of aluminum-silicon alloy coated on at least one surface of said face sheets and free of liquid or solid flux;
   said second heating step is in excess of about 960° F. for melting the aluminum-silicon alloy.

8. A process as defined in claim 7 wherein said enclosing step comprises:
   sealing the face sheets and honeycomb core in an evacuable envelope having an internal surface conforming closely to an external surface of the structure; and further comprising the step of
   applying differential pressure on the envelope during the step of heating to the brazing temperature for holding the face sheets and the honeycomb core in position after decomposition of the adhesive.

9. A process as defined in claim 8 wherein said structure further comprises a plurality of support posts having a length substantially the same as the thickness of said honeycomb core, said posts being located intermittently in cells of said honeycomb core for preventing crushing thereof during application of pressure; and
   said enclosing step further comprises temporarily placing a support frame around said honeycomb core for preventing crushing thereof during application of pressure.

10. A brazing process comprising the steps of:
    temporarily adhesively bonding several elements to form one assembly to be brazed;
    positioning the assembly in contact with a part with braze alloy therebetween;
    holding the assembly and the part in position;
    heating and evacuating the assembly for removing the adhesive; and
    subsequently heating the assembly and the part to brazing temperature while holding in position.

11. A brazing process as defined in claim 10 wherein said adhesively bonded assembly comprises a honeycomb core formed of a plurality of adhesively bonded strip elements, and said part comprises a face sheet, and said holding step comprises
    applying pressure to said face sheet for holding said honeycomb core in place after removal of said adhesive.

References Cited

UNITED STATES PATENTS

| | | | |
|---|---|---|---|
| 2,609,068 | 9/1952 | Pajak | 29—455 |
| 2,614,517 | 10/1952 | Peterson | 29—501 X |
| 2,700,632 | 1/1955 | Ackerlind | 29—455 |
| 2,816,355 | 12/1957 | Herman | 29—471 X |
| 2,961,760 | 11/1960 | Horton et al. | 29—455 |
| 3,011,254 | 12/1961 | Melill et al. | 29—494 |
| 3,091,846 | 6/1963 | Henry | 29—494 |
| 3,110,961 | 11/1963 | Melill et al. | 29—494 |

JOHN P. CAMPBELL, Primary Examiner

R. J. SHORE, Assistant Examiner

U.S. Cl. X.R.

29—455, 471.1, 497, 498, 501